July 27, 1937. H. D. RICE, JR., ET AL 2,088,387
BOTTLE HOLDER
Filed April 27, 1936 2 Sheets-Sheet 1
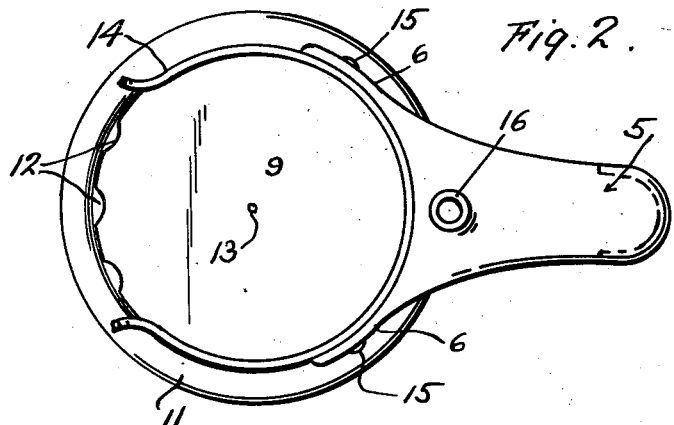
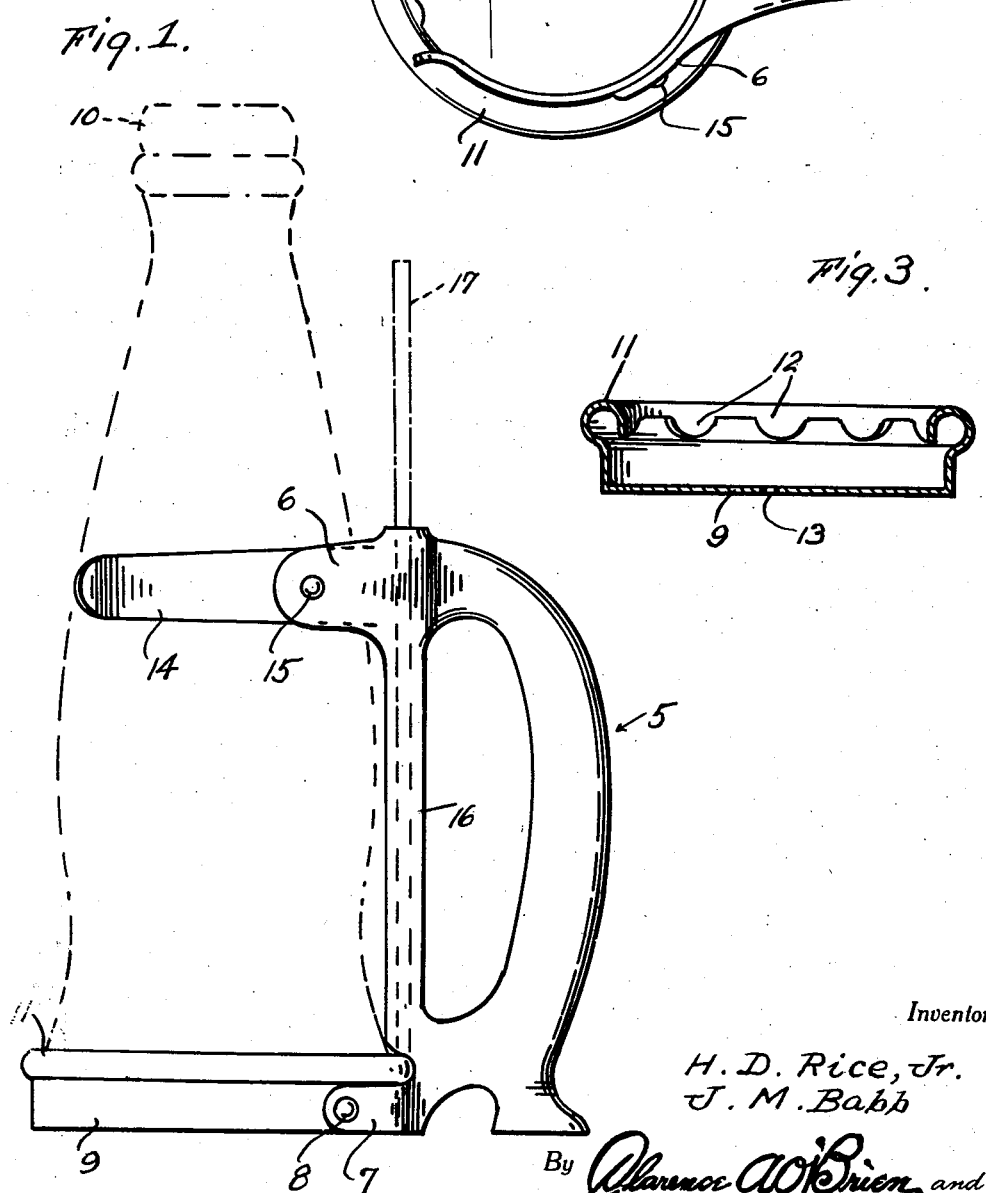
Inventors
H. D. Rice, Jr.
J. M. Babb
By Clarence A. O'Brien and Hyman Berman
Attorneys July 27, 1937.  H. D. RICE, JR., ET AL  2,088,387
BOTTLE HOLDER
Filed April 27, 1936   2 Sheets-Sheet 2

Inventors
H. D. Rice, Jr.
J. M. Babb

By Clarence A. O'Brien and
Hyman Berman
Attorneys

Patented July 27, 1937

2,088,387

UNITED STATES PATENT OFFICE 2,088,387

BOTTLE HOLDER

Hudson Doniphan Rice, Jr., and James Madison Babb, Dallas, Tex.

Application April 27, 1936, Serial No. 76,711

1 Claim. (Cl. 215—101)

This invention is a device for holding a bottle, such as a milk bottle, bottles of the type for serving and vending "soda water" or "pop" or other liquid refreshments to the end that the bottle may be conveniently held while drinking therefrom.

An object of the invention is to provide a holder which may be readily and easily applied to the bottle and will serve as a convenient handle for the bottle.

A further object of the invention is to provide in a device of the character described means for accommodating or holding a straw to be used when partaking of the contents of the bottle.

The invention together with its objects and advantages will be best understood from a study of the following description taken in connection with the accompanying drawings wherein:

Figure 1 is a side elevational view illustrating the application of the invention to a bottle.

Figure 2 is a top plan view of the holder.

Figure 3 is a sectional view through the bottom member of the holder.

Figure 4:
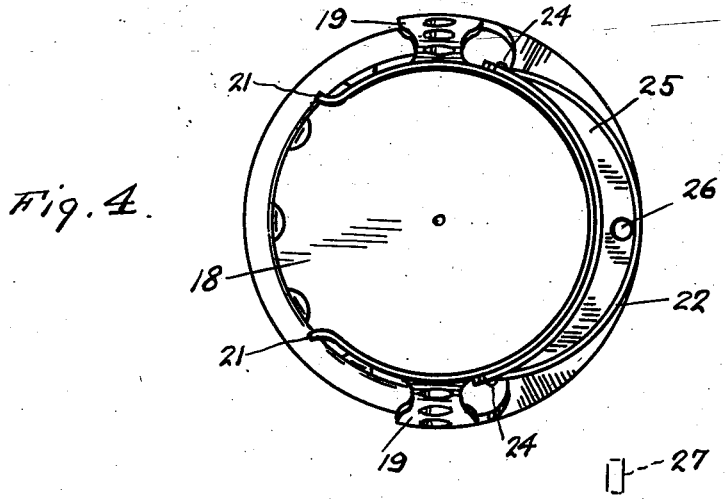
Figure 4 is a top plan view of a slightly modified form of the invention.

Referring to the drawings by reference numerals it will be seen that the holder comprises a handle 5 which may be constructed of any suitable material and which is preferably of the shape shown. At the top and bottom thereof the handle 5 has integral therewith curved ears 6 and 7 respectively.

The ears 7 at the bottom of the handle 5 are pivoted as at 8 to the peripheral wall of a tray or caster 9 formed of any suitable material. The caster 9 is adapted to receive the base of a bottle or the like 10 and the peripheral wall of the caster or tray 9 has its upper edge rolled inwardly as at 11 to resiliently engage the wall of the bottle 10. At the inner edge of the roll 11 said wall is formed to provide notches 12 through which the "sweat" or any moisture on the outside of the bottle 10 may drain into the tray or caster 9.

In the bottom thereof the caster tray 9 is provided with a drain opening 13 through which any moisture collecting in the tray may drain therefrom.

A split resilient clamp 14 is provided to embrace the bottle 10 intermediate the top and bottom of the bottle as shown and this clamp 14 is riveted or otherwise secured to the ears 6 as at 15.

It will thus be seen that in applying the holder to the bottle 10 the base of the bottle 10 is set down into the tray 9 and the bottle forced into the confines of the spring clip 14 which will spring into clamping engagement about the bottle as shown to effectively hold the bottle and the device of the invention assembled.

With the device thus applied to the bottle it will be seen that handle 5 may be used in holding the bottle 10 in one hand to the end that the bottle may be held safely and securely and without the hand of the user being required to come into actual contact with the bottle.

Further in accordance with the present invention the handle 5 has the upright portion 16 thereof hollow so as to accommodate one end of a straw 17 in the manner clearly shown. Thus the device also serves as a convenient holder for the straw when the latter is not being used.

It will also be appreciated that the clip 14 may be so secured at 15 to the ears 6 as to pivot relative thereto thus permitting the clamp or clip 14 and the tray 9 to fold inwardly against the standard 16 of the handle permitting the entire device to be collapsed and when so collapsed to be conveniently stored.

Figure 5:
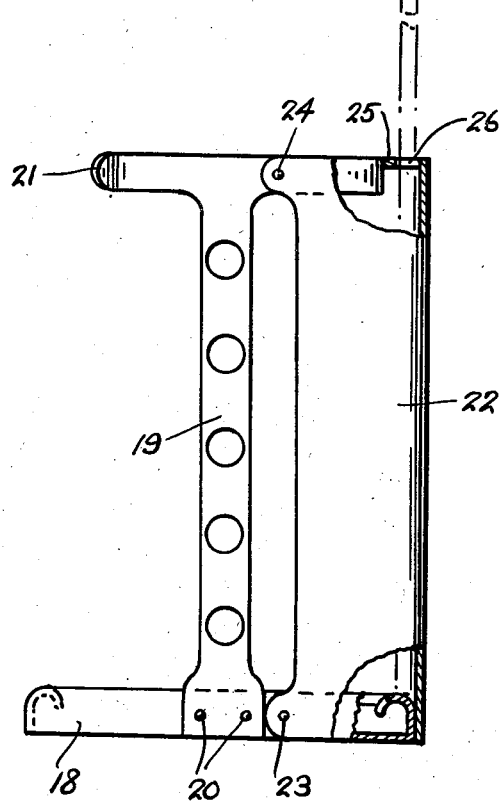
Figure 5 is a side elevational view of the second form of the invention with certain parts broken away and shown in section.

In the form of the invention shown in Figures 4 and 5 there is provided a holder consisting of a tray or caster 18 similar in every respect to the aforementioned tray or caster 9 and which may be formed of the same material from which the tray or caster is formed.

Secured to the peripheral wall of the tray or caster 18 at diametrically opposite sides thereof are post or narrow elongated side plates 19 perforated as shown to reduce the weight thereof and secured at their lower ends to the peripheral wall of the caster 19 as at 20.

Secured to and supported by the upper end of the post or side plates 19, and preferably being integral with the upper ends of said post or side plates is a split bottle-embracing, spring clip 21.

Further in accordance with the present invention an arcuate plate-like member 22, which corresponds somewhat to the handle 5 described with reference to the first form of the invention, has its lower edge flush with the bottom of the caster 18 and secured to the peripheral wall of the caster 18 as at 23.

At its upper corners the member 22 is secured to opposite portions of the clip 21 as at 24.

The member 22 is of plate-like form, and the upper portion of the member 22 is spaced from the closed end of the clip 21 and is provided with an inturned flange 25 that has an arcuate edge which engages the clip as shown in Figure 4 and which is also provided with an opening 26 through which a straw or the like 27 may be passed downwardly to be confined between the plate 22 and the wall of the bottle or the like disposed within the holder.

In this form of the invention it will be understood that the bottle when inserted in the holder will have the bottom portion thereof fitting within the caster 18 with the upper portion of the bottle embraced by the clip 21 and the plate 22 extending about the periphery of the bottle for a portion thereof and served as a contact surface for the palm of the hand, with the thumb of the hand bearing against one of the plates 19 and the fingers of the same hand bearing against the opposite plates 19 so that the hand is substantially held out of contact with the wet bottle.

Having thus described the invention, what is claimed as new is:

A holder for bottles comprising a tray adapted to have the base of a bottle seated therein, a handle member pivoted at one end to said tray, said handle having an arcuate upper edge conforming with the shape of a bottle and an arcuate bottle embracing clip fitted in the arcuate edge of the handle and pivoted to said handle, said tray having a peripheral wall provided with a rolled upper edge, said edge at its inner side being notched so as to permit drippings from the bottle to pass into the tray.

HUDSON DONIPHAN RICE, Jr.
JAMES MADISON BABB.